United States Patent
Farmer et al.

(10) Patent No.: US 7,996,285 B2
(45) Date of Patent: Aug. 9, 2011

(54) METHODS AND SYSTEMS FOR ACCESSING INFORMATION RELATED TO AN ORDER OF A COMMODITY

(76) Inventors: James G. Farmer, Nyssa, OR (US); Charles W. Farmer, Nyssa, OR (US); Joseph W. Farmer, Nyssa, OR (US)

(*) Notice: Subject to any disclaimer, the term of this patent is extended or adjusted under 35 U.S.C. 154(b) by 1186 days.

(21) Appl. No.: 11/636,128

(22) Filed: Dec. 8, 2006

(65) Prior Publication Data

US 2007/0203818 A1 Aug. 30, 2007

Related U.S. Application Data

(63) Continuation-in-part of application No. 11/363,785, filed on Feb. 27, 2006.

(51) Int. Cl.
*G06Q 10/00* (2006.01)
*G06Q 99/00* (2006.01)
(52) U.S. Cl. ......................................... 705/28; 705/7.11
(58) Field of Classification Search .................. 707/736, 707/758; 705/7, 14.49, 500, 7.11, 22, 28
See application file for complete search history.

(56) References Cited

U.S. PATENT DOCUMENTS

| | | | |
|---|---|---|---|
| 5,478,990 A * | 12/1995 | Montanari et al. ............ 235/375 |
| 5,913,210 A | 6/1999 | Call | |
| 6,545,604 B1 * | 4/2003 | Dando et al. ................ 340/572.1 |
| 6,963,881 B2 | 11/2005 | Picket et al. | |
| 7,183,923 B2 * | 2/2007 | Sasaki et al. ................ 340/572.1 |
| 7,681,527 B2 * | 3/2010 | Pratt ............................. 119/174 |
| 2001/0011437 A1 * | 8/2001 | Shortridge et al. ............ 47/58.1 |
| 2001/0032161 A1 * | 10/2001 | Thomas et al. ................. 705/36 |
| 2003/0069772 A1 | 4/2003 | Roberts et al. | |
| 2004/0083201 A1 * | 4/2004 | Sholl et al. ......................... 707/1 |
| 2004/0122733 A1 * | 6/2004 | Hanschen et al. .............. 705/14 |
| 2004/0177011 A1 * | 9/2004 | Ramsay et al. ................. 705/28 |
| 2005/0051109 A1 | 3/2005 | Fantin et al. | |
| 2005/0075900 A1 * | 4/2005 | Arguimbau ....................... 705/1 |

(Continued)

FOREIGN PATENT DOCUMENTS

JP 2002-297625 10/2002

(Continued)

OTHER PUBLICATIONS

Anon., "John Deere Partners with Vantagepoint Network and Cropverifeye.Com, Llc to Introduce the New Croptracer™ System," PR Newswire, Feb. 26, 2001.*

(Continued)

*Primary Examiner* — Nicholas D Rosen
(74) *Attorney, Agent, or Firm* — Holland & Hart LLP

(57) ABSTRACT

Methods of allowing a customer to access information related to an order of a commodity include gathering inspection information from a commodity lot, collecting grower, field, and packing information associated with the commodity lot, recording purchase orders associated with the commodity lot, assigning a trace code to each of the purchase orders, entering the inspection information; the grower, field, and packing information; the purchase orders; and the trace codes into a central database. Once entered into the central database, the content of a web-based application may be updated with the inspection information, the grower, field, and packing information, the purchase orders, and the trace codes within the central database, thereby allowing the customer to access the inspection information, and the grower, field, and packing information, by entering one of the trace codes into the web-based application.

14 Claims, 15 Drawing Sheets

U.S. PATENT DOCUMENTS

| | | | |
|---|---|---|---|
| 2005/0086132 A1* | 4/2005 | Kanitz et al. | 705/28 |
| 2007/0118739 A1 | 5/2007 | Togashi et al. | |
| 2007/0156544 A1 | 7/2007 | Meyer et al. | |
| 2008/0065473 A1 | 3/2008 | Stroman et al. | |

FOREIGN PATENT DOCUMENTS

| | | |
|---|---|---|
| KR | 10-2004-0110912 | 12/2004 |
| WO | WO-2005002747 A1 * | 1/2005 |
| WO | WO-2005/022303 A2 * | 3/2005 |

OTHER PUBLICATIONS

Anon., "Safety Net: In Light of a Recent Spike in Discoveries of Foodborne Contamination, Preventing Such Events at All Points in the Food Supply Chain has Become More Important Than Ever," Progressive Grocer, vol. 83, No. 6, p. 67, Apr. 15, 2004.*

Clemens, R., "Meat Traceability in Japan," Iowa Ag Review, Fall 2003, vol. 9, No. 4.*

International Search Report dated Nov. 20, 2009, for International Application No. PCT/US2009/039533 (3 pgs.).

* cited by examiner

Inspection Details

| | | | | |
|---|---|---|---|---|
| Run No. 050902 | CAIP Initials RC JF | USDA Initials | Time 14:01:14 | |
| Color YELLO | Size JBO | Brand | Onion Count 0 | 3.5 and Over 0.00 |
| Size Min 3.00 | Size Max 4.50 | OffsizeMin 0.00 | OffsizeMax 0.00 | |

| | | | |
|---|---|---|---|
| Tops 0.00 | Peelers 0.00 | Sunburn 0.00 | Appr Staining 0.00 |
| Damage 0.00 | Decay 0.00 | Serious Damage 0.00 | Bad Staining 0.00 |

☐ Cuts & Bruises ☐ Misshapen ☐ Seed Stems ☐ Close Trim Necks ☐ Dry Sunken Area ☐ Mold Other: ☐ Sprouts ☐ Sour Skin ☐ Cracked Fleshy Scale
☐ Watery Scale ☐ Translucent Scale ☐ Off Variety Abbreviations: G= Generally 90%+, V=Mostly 55%-89%, M=Many 26%-45%, S=Some 11%-25%, F=Few 0%-10%

| | | | | |
|---|---|---|---|---|
| Shape Well G | Shape Fairly Well F | Clean G | Fairly Clean F | Dirty |
| Bright F | Fairly Bright V | Dull S | Firm V | Fairly Firm S |

Maturity M   Out of Grade No   Dumped 0   Reran 0

Image    ☐ ReInspection    Next    Done    Cancel

Inspection Report Summary

File No. 62247

| Product | Samples | Avg Onion Count | OffSize Minimum | OffSize Maximum | Tops | Peelers | Damage | Serious Damage | Decay |
|---|---|---|---|---|---|---|---|---|---|
| JY1GNP50  Run: 1  Jumbo Yellow GOLD N PRIDE 50# | 48 | 63.72 | 0.04% | 0.00% | 5.53% | .02% | .42% | .35% | .35% |
| JY1NONE50  Run: 1  Jumbo Yellow NON BRAND 50# | 15 | 52.73 | 0.00% | 0.00% | 2.86% | .05% | .53% | .07% | .07% |
|  |  |  |  |  |  |  |  |  |  |

KEY (Per 50lb.)
Note: Decay % is included in Damage % and Serious Damage
US #1 Offsize Min allowed (undersize) is 5%
US #1 Offsize Max allowed (oversize) is 10%
US #1 Tops allowed is 30%
US #1 Peelers allowed is 10%
US #1 Damage allowed is 5%
US #1 Decay allowed is 2% (Decay is included in Damage% and Serious Damage %)

Avg Onion Count
55-60 Onions per 50lb bag – 80% or Better 3.5 Inch Onions
60-65 Onions per 50lb bag – 75% or Better 3.5 Inch Onions
65-70 Onions per 50lb bag – 70% or Better 3.5 Inch Onions US #2 Percentage Tolerances for Damage, Decay, and Offsize are the same as US #1. Other Requirements do not apply.

Serious Damage – Any specific defect which seriously detracts from the appearance, or the edible marketing quality of the onions.

FIG. 9

PACKING FACILITY NAME

[Back] ## Ship Details

| File No | Brand | Description | Picture | USDA PLI Trace | Trace Writeup | Grower | Qty |
|---|---|---|---|---|---|---|---|
| 62247 | JY1GNP50 | Jumbo Yellow GOLD N | | 49401 | View | Deseret Farms | 193 |
| 62247 | JY1NONB50 | Jumbo Yellow NON BR | | 49102 | View | Nelson, Ken | 675 |

*FIG. 11*

METHODS AND SYSTEMS FOR ACCESSING INFORMATION RELATED TO AN ORDER OF A COMMODITY

RELATED APPLICATIONS

This application is a continuation-in-part of U.S. patent application Ser. No. 11/363,785 titled "Methods and Systems for Accessing Information Related to an Order of a Commodity" filed on Feb. 27, 2006, which application is incorporated herein by reference in its entirety.

BACKGROUND

The ability to trace produce back to its packing facilities, inspection points, and even the field in which it was grown is becoming more of a necessity in the produce industry as concerns regarding food safety increase. In the event of a food-borne illness outbreak, for example, damage may be limited if the source of the contaminated product is identified quickly so that other products grown in the same field, processed in the same packing facility, and/or transported in the same vehicle can be quarantined.

The events of Sep. 11, 2001 reinforced the need to enhance the security of the United States. They also raised awareness of the possibility of bioterrorism attacks. Hence, Congress passed the Public Health Security and Bioterrorism Preparedness and Response Act of 2002 (the Bioterrorism Act), which requires food handlers to establish and maintain records for all food directly in contact with its finished container.

In addition, many customers, such as brokers and retailers, are increasingly requesting real time access to information regarding the produce they buy. For example, they often desire to view shipping, tracing, and inspection information immediately after they place an order for produce. Many customers also require independent certification audits of all produce sold in their stores.

Currently, much of the shipping, tracing, and inspection information is recorded on paper. Moreover, a myriad of different recording techniques are used to record this information. Consequently, it is often difficult to comply with government requirements to be able to quickly trace produce back to the packing facility in which it was processed and to the field in which it was grown. It is also difficult to comply with customers' requests to instantaneously access information regarding their produce orders.

SUMMARY

Methods of allowing a customer to access information related to an order of a commodity include gathering inspection information from a commodity lot, collecting grower, field, and packing information associated with the commodity lot, recording purchase orders associated with the commodity lot, assigning a trace code to each of the purchase orders, entering the inspection information; the grower, field, and packing information; the purchase orders; and the trace codes into a central database. Once entered into the central database, the content of a web-based application may be updated with the inspection information, the grower, field, and packing information, the purchase orders, and the trace codes within the central database, thereby allowing the customer to access the inspection information, and the grower, field, and packing information, by entering one of the trace codes into the web-based application. According to one exemplary embodiment, each of the purchase orders associated with the commodity lot is linked within the web-based application.

Systems for allowing a customer to access information related to an order of a commodity include a server configured to store the information in a central database, the information including inspection information corresponding to a single source lot of the order of the commodity including an inspection photograph of the source lot of the commodity and at least one or more of sales information, shipping information, packout information, inventory information, and tracing information corresponding to the order of the commodity. Additionally, one or more terminals having one or more applications configured to enter the information into the central database and a web-based application configured to allow the customer to access the information within the central database are included in the exemplary system. According to one exemplary embodiment, multiple orders from the single source lot are linked to facilitate access to all orders of the commodity originating from the single source lot.

BRIEF DESCRIPTION OF THE DRAWINGS

The accompanying drawings illustrate various embodiments of the principles described herein and are a part of the specification. The illustrated embodiments are merely examples and do not limit the scope of the disclosure.

FIG. 5 is a screen shot of an exemplary produce inspection software program that may be used by an inspector to enter an inspection report into the central database according to principles described herein.

FIG. 9 is a screen shot of a web page showing an exemplary inspection report summary according to principles described herein.

FIG. 11 is a screen shot of a web page showing an exemplary number of shipping details of a particular order according to principles described herein.

Throughout the drawings, identical reference numbers designate similar, but not necessarily identical, elements.

DETAILED DESCRIPTION

Methods and systems for allowing a customer, a supplier, or a regulatory agency to access information related to an order of a commodity are described herein. The information may include sales information, shipping information, tracing information, and/or inspection information corresponding to the order of the commodity. In some examples, as will be described in more detail below, the information is entered into a central database via one or more applications residing on one or more terminals. A web-based application is regularly updated with the information within the central database. An authorized customer, supplier, regulatory agency, or other entity may then login to the web-based application and access the desired information related to the order of the commodity.

As used herein and in the appended claims, unless otherwise specifically denoted, the term "customer" will be used to refer to any authorized entity that logs into the web-based application and accesses information related to an order of commodity. Exemplary, but not exclusive, customers include, brokers, retailers, individual buyers, inspectors, shippers, growers, regulatory agencies, and others involved in the supply chain of the commodity.

It will be recognized that the systems and methods described herein may be applied to any type of commodity and are not limited to produce only. For example, the systems and methods described herein may be used to keep track of and access information regarding the production, processing, inspection, and/or shipment of any type of produce (e.g., fruits and vegetables), grain, meat, livestock, or other food product. However, for illustrative purposes only, produce will be used in the examples described herein.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
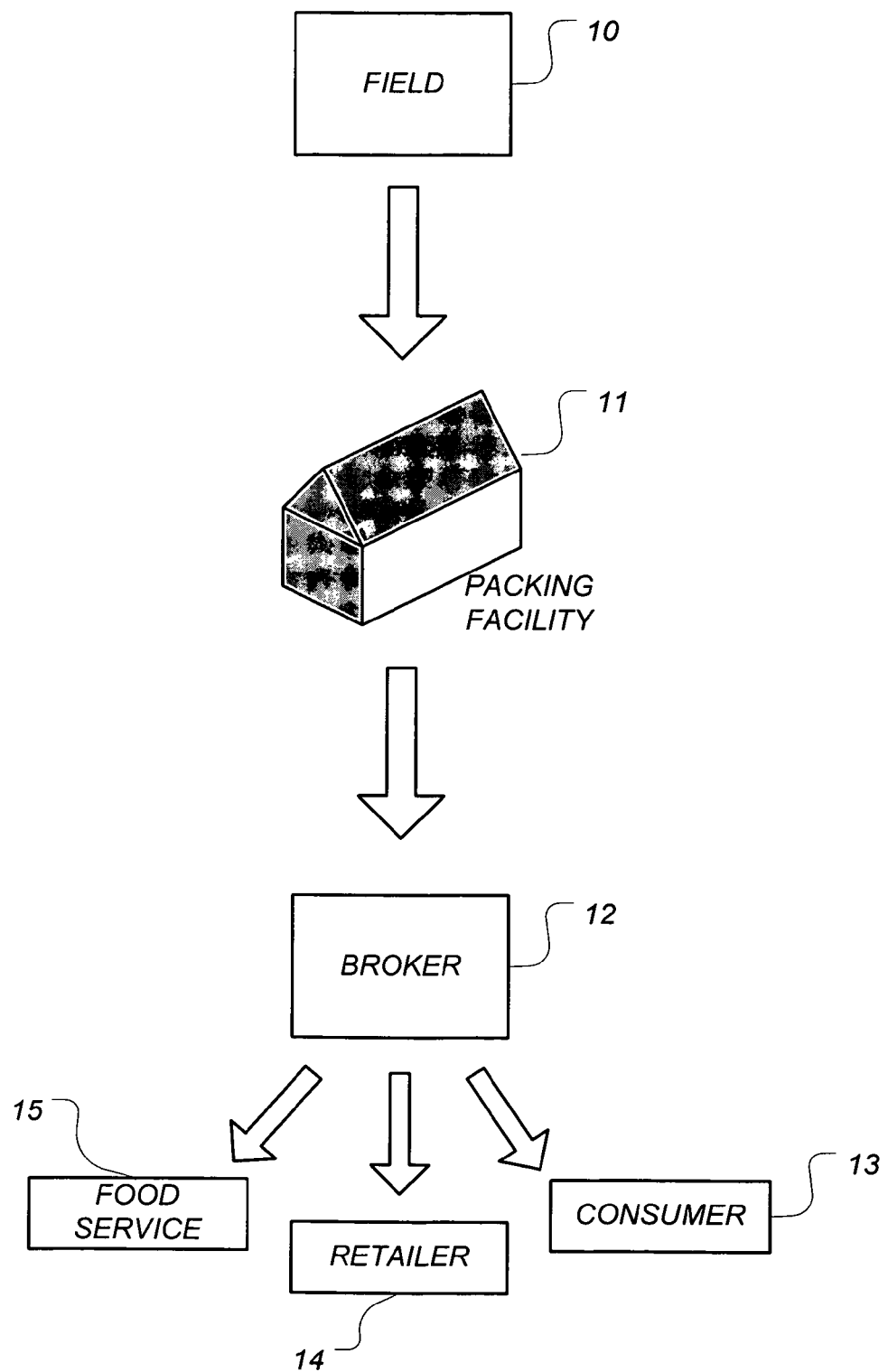
FIG. 1 illustrates an exemplary supply chain or path that produce may take in route to an end consumer according to principles described herein.

FIG. 1 illustrates an exemplary supply chain or path that produce may take in route to an end consumer. As shown in FIG. 1, the produce is first grown in a field (10) or in any other suitable environment. The produce is then harvested and taken to a packing facility (11) where it is processed and packed for shipment to various destinations. The packing facility (11) is also known as a packing shed or a packing house. In some alternative examples, harvested produce is first taken to a storage facility where it is stored for a period of time prior to being taken to the packing facility (11).

Packing facility operations may vary depending on the particular produce being processed. For example, packing facility operations may be as simple as moving produce from a field lug into a shipping container. Alternatively, packing facility operations may include a variety of handling practices including, but not limited to, cleaning, waxing, sizing, quality grading, color sorting, and inspecting.

Produce is often inspected at the packing facility (11) by a United States Department of Agriculture (USDA) inspector. Alternatively, many packing facilities (11) now participate in the USDA's Customer Assisted Inspection Program (CAIP). Under CAIP, a packing facility (11) hires its own internal inspector that has been certified by the state to inspect produce. The inspector's work is reviewed periodically by a USDA certified state inspector to ensure that inspection procedures are properly followed. The inspection procedure and other packing facility operations will be described in more detail below.

Once the produce has been processed in the packing facility (11) and packed, it is transported to various buyers. Produce is often bought by a broker (12), which, in turn, distributes the produce to various end consumers (13), retailers (14), or other food service entities (15). In some alternative arrangements, the packing facility (11) serves as a broker and distributes the produce directly to the customers.

As mentioned, produce buyers often desire access to information concerning the production, processing, inspection, and transportation of the produce that they purchase. This information includes, but is not limited to, load quantities, pricing, tracing information (i.e., information describing the grower of the produce and the particular field where the produce was grown), inspection report summaries, transport vehicle information, and images of the produce while still in the processing stage.

Figure 2:
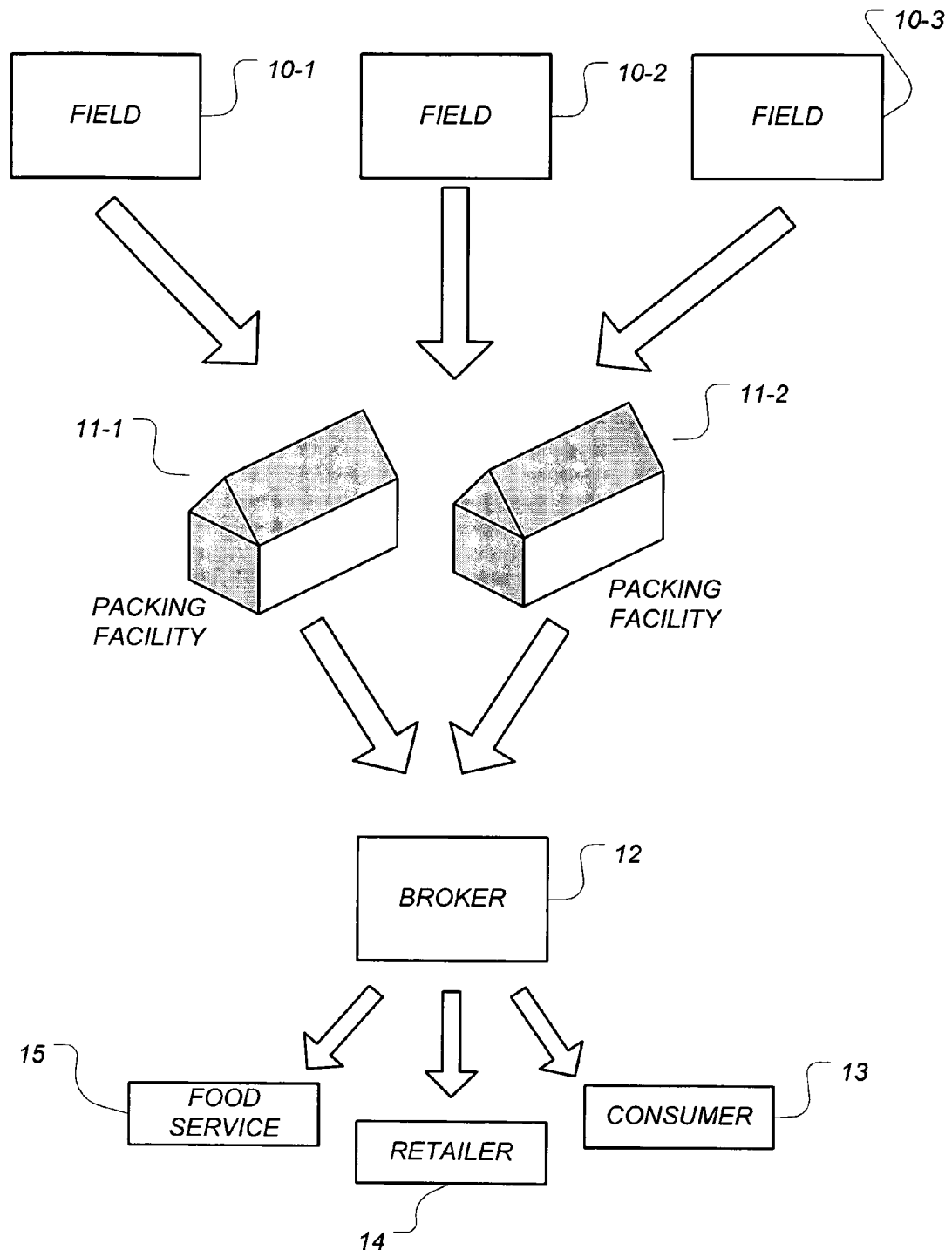
FIG. 2 illustrates multiple exemplary supply chains that produce may take in route to an end consumer according to principles described herein.

However, as shown in FIG. 2, a particular piece of produce that is sold to a broker (12) or a retailer (14), for example, may originate in one of many different fields (e.g., 10-1 through 10-3), be processed in one of many different packing facilities (e.g., 11-1, 11-2), and take one of many different transportation routes before it arrives at its final destination. Moreover, each packing facility (11) may use different recording, tracking, and inspection procedures. For these reasons, accessing desired information corresponding to produce once it is processed and shipped is often a difficult and lengthy process.

Hence, the systems and methods described herein may be used to standardize the recording procedures used by growers, packing facilities, inspectors, and shippers so that buyers may have real-time access to information related to the production, processing, inspection, and transportation of the produce that they purchase. As will be described in more detail below, a web-based application may be used to trace produce and to give produce buyers real-time access to information related to their purchase order.

Figure 3:
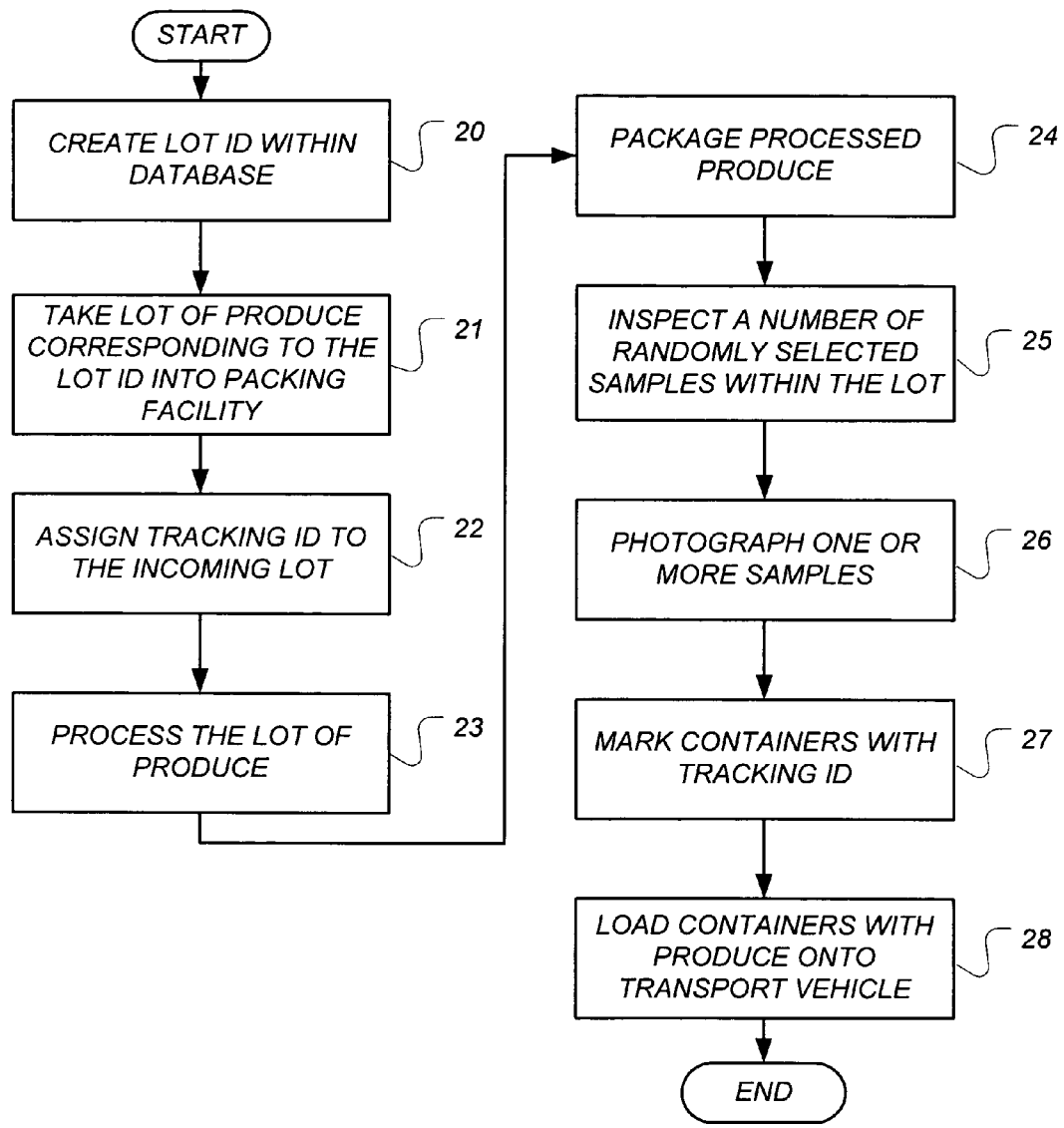
FIG. 3 is a flow chart illustrating an exemplary packing process that may be used within a packing facility to facilitate real-time access to processing, shipping, tracing, and inspection information corresponding to a lot of produce that is processed within the packing facility according to principles described herein.

FIG. 3 is a flow chart illustrating an exemplary packing process that may be used within a packing facility to facilitate real-time access to processing, shipping, tracing, and inspection information corresponding to a lot of produce that is processed within the packing facility. It will be recognized that the steps shown in FIG. 3 are merely exemplary and that they may be modified, reordered, added to, and/or removed as best serves a particular application. As shown in FIG. 3, a "lot identification" (lot ID) corresponding to a particular lot of produce to be processed in the packing facility is created within a central database (step 20). As used herein and in the appended claims, unless otherwise specifically denoted, the term "lot" will be used to refer to a particular batch or quantity of produce of the same kind that is taken to the packing facility to be processed. The lot ID may include any number of characters as best serves a particular application.

The central database used in connection with the process of FIG. 3 may created within any database application as best serves a particular application. Exemplary database applications that may be used include, but are not limited to, Fox-Pro™, Structured Query Language (SQL), and Microsoft™ Access™.

In some examples, the lot ID is linked within the central database to one or more lot attributes. For example, the lot ID may be linked to digital photographs, videos, or other multimedia presentations of the grower of the produce, the field where the lot of produce is grown, and the packing facility where the lot of produce is processed. Text describing the grower, field, packing facility, and/or third party audits of the produce may be additionally or alternatively be linked to the lot ID. The text may include, but is not limited to, the name of the grower, global positioning satellite (GPS) coordinates of the field, seed variety information, a description of the packing facility, and/or any other applicable information.

Additionally, according to one exemplary embodiment, the text may be linked to a third party information website. For example, the text may include a link to a third party mapping service such as GOOGLE MAP, YAHOO MAPS, or MAPQUEST that provides a geographical map identifying the location of the field. According to this exemplary embodiment, the lot ID is linked to coordinates of the field location. When the link to the third party mapping service is selected, the coordinates are automatically entered into the query page of the third party mapping service, providing the desired map/photos.

As mentioned, text or multimedia presentations describing third party audits of the produce may additionally or alternatively be linked to the lot ID. Third party audits allow end customers to verify that the grower or shipper is using "good agricultural practices" and "good handling practices." The audits may be performed by any third party, e.g., Primus Labs.

As shown in FIG. 3, the lot of produce corresponding to the lot ID is then taken into the packing facility to be processed (step 21). A tracking ID may then be assigned to the incoming lot within the central database (step 22). As will be described in more detail below, the tracking ID may be used anywhere in the supply chain to trace the lot of produce back to the packing facility and to the field in which the lot of produce was grown.

In some examples, the tracking ID is referred to as a run number and includes the date and order in which the lot is processed in the packing facility. For example, if the lot is the first lot to be processed in the packing facility on Apr. 18 of a given year, it may be assigned a tracking ID of Apr. 18, 2001.

In some examples, the tracking ID may additionally or alternatively include a USDA positive lot identification (PLI) number. USDA PLI numbers are issued by the USDA to inspected lots of produce and are used to trace produce that is in commerce back to its packing facility. In some examples, the USDA PLI number is linked to the lot ID within the central database so that it may also be used to trace the produce back to the field in which it was grown.

In some alternative examples, both a run number and a USDA PLI number are assigned to an incoming lot of produce. A separate run number is advantageous in some instances because it may be easier for workers in the packing facility to work with run numbers rather than USDA PLI numbers. However, it will be recognized that run numbers and USDA PLI numbers are merely illustrative of the many different types of tracking numbers that may be assigned to an incoming lot of produce.

Figure 4:
FIG. 4 is a screen shot of an exemplary software program that may be used by a packing facility worker to assign a tracking identification (ID) to an incoming lot of produce within a central database according to principles described herein.

FIG. 4 is a screen shot of an exemplary software program that may be used by a packing facility worker to assign a tracking ID to an incoming lot of produce within the central database. As shown in FIG. 4, the packing facility worker may be presented with a number of additional input fields for each lot of produce processed. For example, the worker may additionally enter the date, lot ID, and/or various details regarding the particular lot of produce being processed.

Returning to FIG. 3, the lot of produce is then processed (step 23). As mentioned, the produce may be processed in a variety of different manners. For example, the produce may be cleaned, waxed, sized, quality graded, and/or sorted.

After the produce has been processed, it is packaged into containers (step 24). Once packaged, random samples of the produce within the lot are inspected by an inspector (step 25). As mentioned, the inspector may be an internal inspector hired by the packing facility. Alternatively, the inspector may be a government inspector assigned to the packing facility. A number of different qualities of the produce may be inspected depending on the particular type of produce being processed. For example, the inspector may ensure that the produce has been properly sorted and labeled by weight, color, quality, and/or grade.

In some examples, the inspector enters an inspection report into a software program that is linked to the central database. In this manner, the inspection report may be linked to a particular tracking ID within the central database. For example, FIG. 5 is a screen shot of an exemplary produce inspection software program that may be used by an inspector to enter an inspection report into the central database. As shown in FIG. 5, the program allows the inspector to enter the tracking ID of the inspected samples; information identifying the inspector; and information corresponding to the brand, weight, color, quality, and/or grade of the produce. In some examples, the software program automatically date and time stamps the entry made by the inspector.

Returning to FIG. 3, a digital photograph of one or more samples within the lot of produce may also be taken (step 26). In some examples, the first sample within the lot of produce that is processed is photographed. Additionally or alternatively, one or more of the samples that are inspected are photographed. The photographs may then be stored and linked within the central database to the tracking ID.

Figure 6:
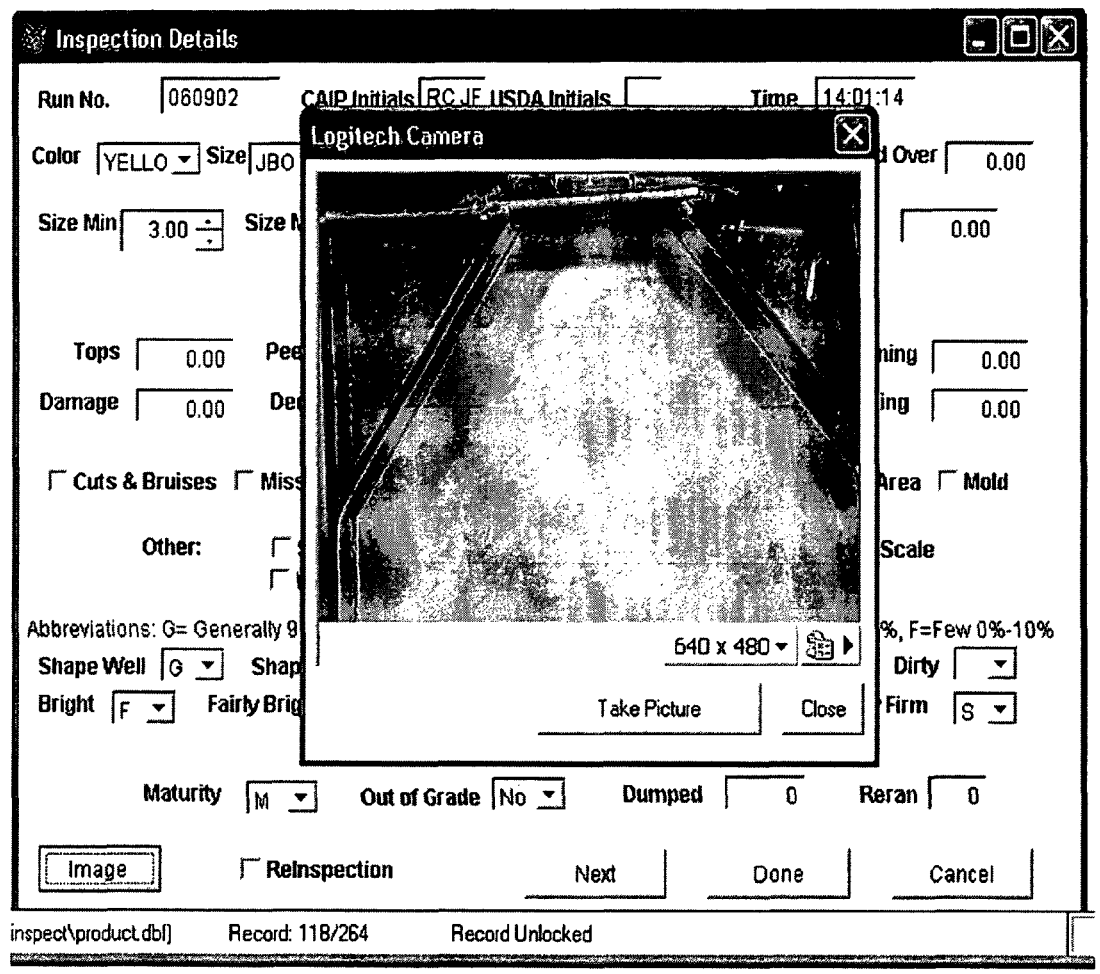
FIG. 6 is a screen shot illustrating an exemplary program that may be used to take digital photographs of the produce according to principles described herein.

In some examples, the camera that is used to take the digital photographs of the produce is controllable via a computer software interface. For example, as shown in FIG. 5, the software program used to inspect the produce may also include a button (50) that may be selected to activate a program that is used to take the digital photographs. FIG. 6 is a screen shot illustrating an exemplary program that may be used to take digital photographs of the produce.

In some examples, digital video of one or more samples within the lot of produce may additionally or alternatively be taken and linked to the tracking ID. For example, digital video may record some or all of the processing of a particular sample of produce in the packing facility.

Returning to FIG. 3, the containers are then marked with the tracking ID and/or other desirable information (e.g., lot and quantity information) (step 27). In some examples, the marking includes a bar code, radio frequency ID, or any other tagging system identifier.

In some examples, the marking information is printed on a tag that is affixed to each container. Additionally or alternatively, the marking information may be stamped or otherwise printed directly on each container.

In some examples, the marking information is affixed directly to each piece of produce within an order (e.g., a sticker is affixed to each piece of fruit within an order). However, it will be recognized that in some instances, it is too labor intensive to mark each individual piece of produce or even each individual container within an order. Hence, the marking information may alternatively be affixed to one or more pallets of containers in a particular order.

The containers of produce may then be loaded onto a transport vehicle (e.g., a truck, ship, airplane, etc.) (step 28) and transported to one or more buyers who have placed orders for various quantities of produce. Each order is assigned a purchase order (PO) number within the central database.

In some examples, the tagging system identifier (e.g., the bar code) corresponding to the containers in a particular purchase order is scanned into the central database as the containers are loaded onto the transport vehicle to fulfill the purchase order. In this manner, the purchase order number may be linked to the tracking ID within the central database. Additional information, such as the quantity of produce included within the shipment, may also be linked to the tracking ID within the central database.

After a Bill of Lading is completed with the operator of the transport vehicle, the order may then be finalized by a shipping clerk within the central database. In this manner, as will be described in more detail below, a customer may see via the Internet that his or her order has shipped almost as soon as the produce is loaded onto the transport vehicle.

Figure 7:
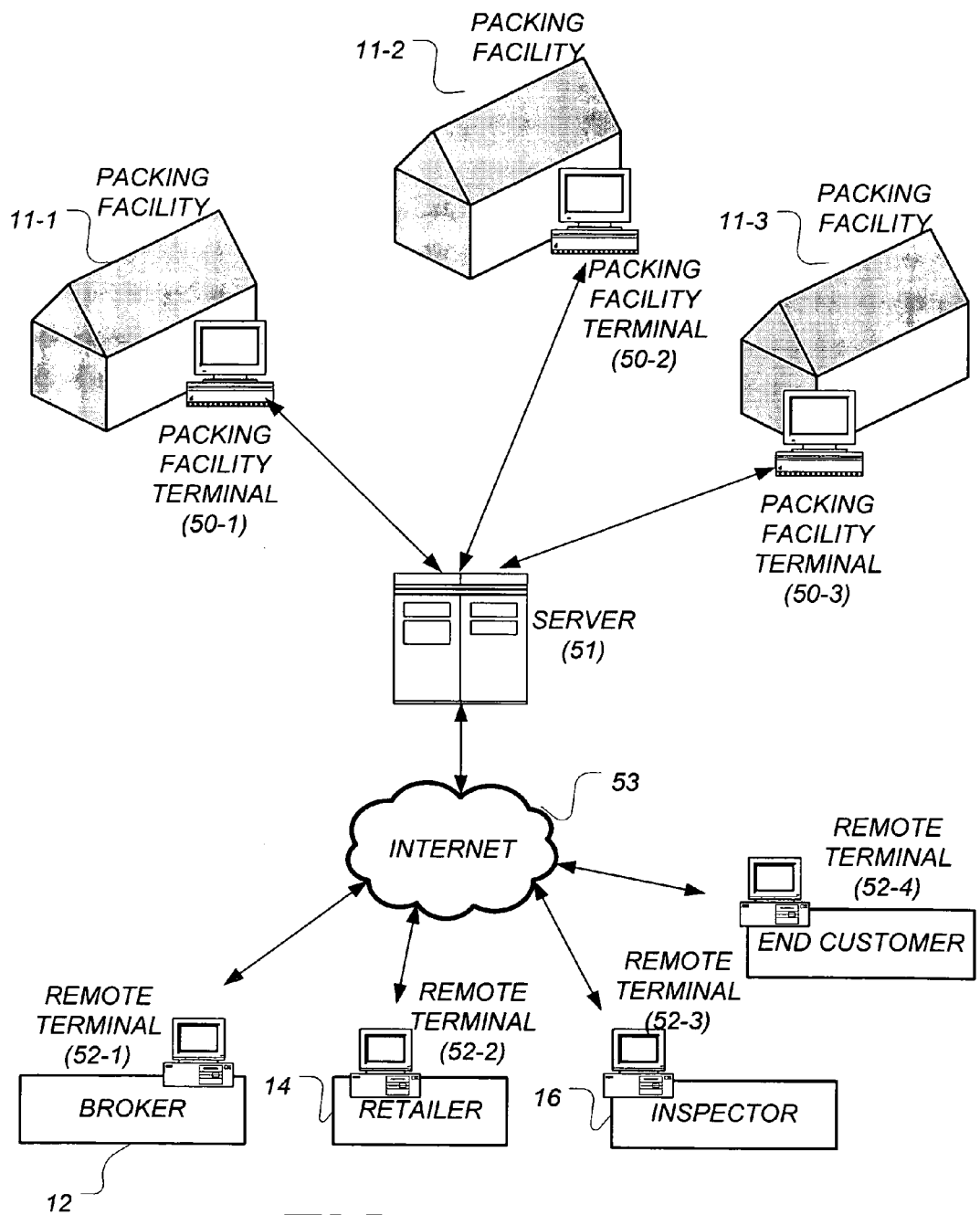
FIG. 7 illustrates an exemplary system whereby a customer may access information regarding a pending or already placed produce order via the Internet or any other type of networking configuration according to principles described herein.

FIG. 7 illustrates an exemplary system whereby a customer may access information regarding a pending or already placed produce order via the Internet or any other type of networking configuration. The information may include, but is not limited to, sales, shipping, tracing, inspection, and other load information. As shown in FIG. 7, a packing facility terminal (50) may be located at a number of different packing facilities (11-1 through 11-3). Information regarding the production, processing, and inspection of an order of produce at each packing facility (11) is entered into the central database using the packing facility terminals (50) as described above in connection with FIGS. 3-6. This information is stored on a central server (51) which may also be located at any suitable location. The server (51) is connected to the Internet (53) or any other suitable network.

As shown in FIG. 7, any authorized customer or other entity that is also connected to the Internet (53) may access the information stored on the server (51). For example, a broker (12) may access the information stored on the server (51) using remote terminal (52-1), a retailer (14) may access the contents of the server (51) using remote terminal (52-2), an inspector (16) may access the contents of the server (51) using remote terminal (52-3), and/or an end customer (18) may access the contents of the server (51) using remote terminal (52-4).

It will be recognized that the information entered at each packing facility (11) may alternatively be stored in separate databases residing at the packing facilities (11). Information stored in these separate databases may be accessed by querying each separate database instead of querying a central database. In some alternative examples, the information may be stored on separate databases residing at the packing facilities (11) and in a central database located at the server (51). In this manner, desired information may be accessed by querying the packing facility databases directly or by querying the central database.

Each of the terminals (50, 52) shown in FIG. 7 may include any suitable computing device configured to be connected to the Internet (53). For example, the terminals (50, 52) may include, but are not limited to, personal computers, personal digital assistants (PDAs), and cellular phones. In some alternative examples, a customer without a connection to the Internet (53) may access information regarding a produce order by using an automated telephone system.

As mentioned, an authorized customer may access the information stored on the server (51) via a web-based application. In some examples, the contents of the web-based application are continuously updated with the contents of the database so that the information seen on the web-based application is always current. In some alternative applications, the contents of the web-based application are updated periodically as best serves a particular application.

In some examples, the web-based application is maintained by a produce facility, broker, or other entity. The customer may be given a username and password and may then login and view information specific to his or her produce order. An exemplary web-based application configured to provide information regarding a produce order will now be described. It will be recognized that the web-based application described herein is merely illustrative of the many different web-based applications that may be used to provide access to information regarding a produce order to a customer or to any other authorized entity.

Figure 8:
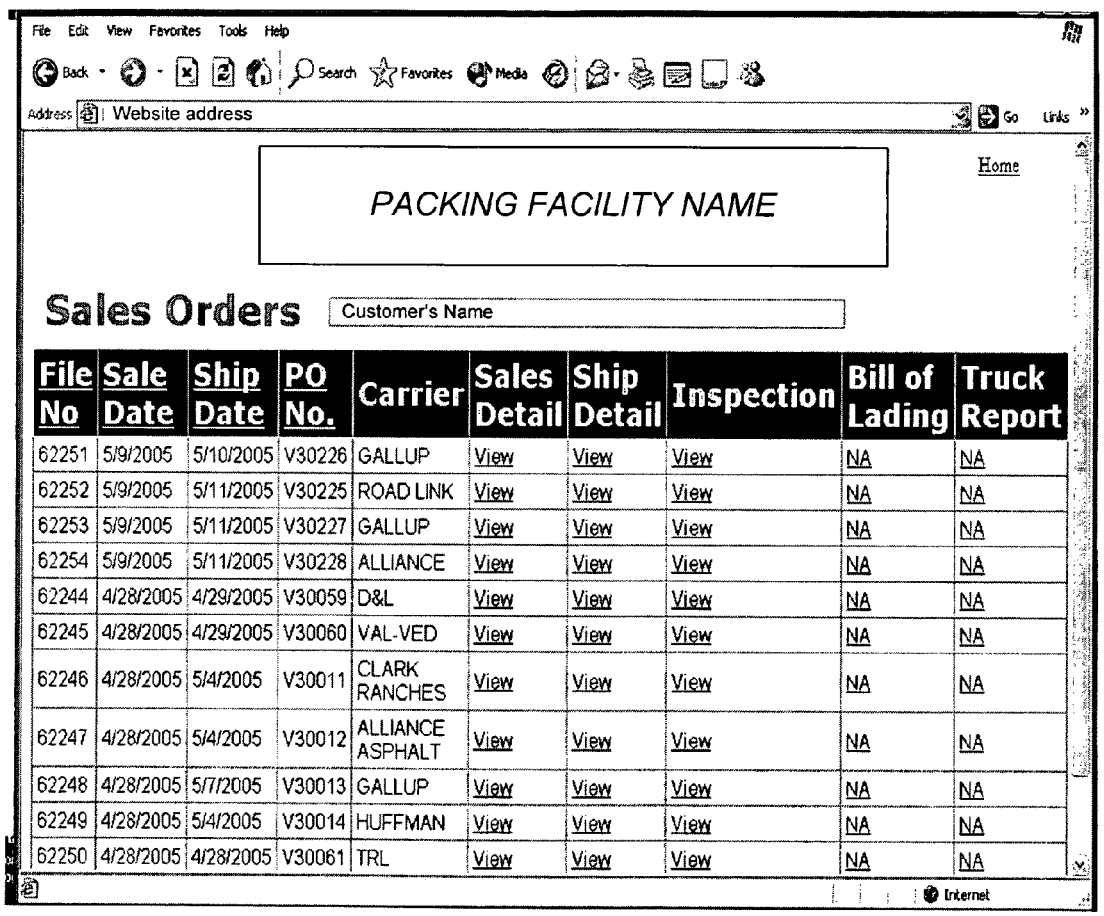
FIG. 8 is a screen shot illustrating a sales orders summary web page that appears after a customer logs on to the web-based application according to principles described herein.

FIG. 8 is a screen shot illustrating a sales orders summary web page that appears after a customer logs on to the web-based application. As shown in FIG. 8, the web page gives a summary of all the customer's sales orders within a given time frame. Each sales order includes a file number (a number assigned to the order by the central database), a sales date, a ship date, a purchase order (PO) number, the name of the transport carrier, a link to view the order's sales details, a link to view the order's shipping details, a link to view the inspection report summary corresponding to the order, a link to view the Bill of Lading corresponding to the order, and a link to view a report of the transport vehicle (e.g., a truck). In some examples, the customer may sort the information shown in the sales orders web page by file number, sale date, ship date, or PO number.

In some examples, the customer may desire to view detailed information regarding a particular order. For example, the customer may desire to view the inspection report summary corresponding to the order having the file number of 62247. To do so, the customer selects the "View" link under the "Inspection" heading corresponding to the file number 62247. Upon selecting the "View" link, a detailed inspection report summary may appear on the screen.

FIG. 9 is a screen shot of a web page showing an exemplary inspection report summary. As shown in FIG. 9, the inspection report summary may include information regarding the inspection of all the different brands or products within the selected order and is derived from the information entered into the central database by the inspector at the packing facility. The inspection report summary shown in FIG. 9 corresponds to an order of onions for illustrative purposes only. It will be recognized that the information included within the inspection report summary may vary depending on the contents of the order and the information provided by the inspector.

In some examples, the customer may desire to view the details regarding the inspection of a specific sample of produce within the order. Hence, a link (not shown) to the full inspection notesheets that are averaged together the obtain the inspection report summary of FIG. 9 may also be included on the web page shown in FIG. 8. By selecting this link, an image of a full inspection notesheet may appear on the screen. The contents of the full inspection notesheet may vary as best serves a particular type of produce being inspected.

Returning to FIG. 8, the customer may alternatively desire to view the sales details for a particular order of produce (e.g., file number 62247). To do so, the customer may select the "View" link under the "Sales Detail" heading corresponding to the file number 62247. Upon selecting the "View" link, a sales details summary for the selected order appear on the screen.

Figure 10:
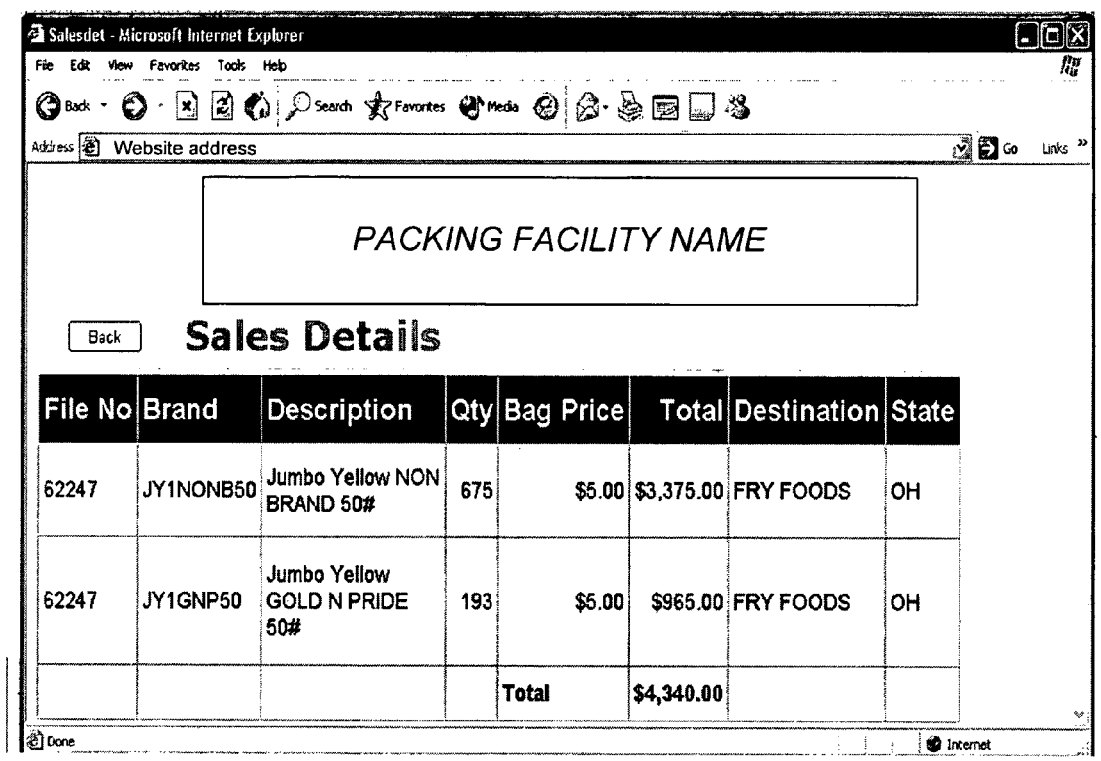
FIG. 10 is a screen shot of a web page showing an exemplary number of sales details corresponding to a selected order according to principles described herein.

FIG. 10 is a screen shot of a web page showing an exemplary number of sales details corresponding to a selected order. As shown in FIG. 10, the sales details summary may show the name of each brand of produce included within the order and description, quantity, pricing, and shipping destination information for each of the brands included within the order.

For example, as shown in FIG. 10, the order having the file number 62247 includes two different brands of onions. The first brand is called JY1NONB50 and the second brand is called JY1GNP50. The order includes 675 bags of the first brand at $5.00 per bag and 193 bags of the second brand at $5.00 per bag for a total purchase price of $4,340.00. Each brand is destined for "Fry Foods" in Ohio.

Once an order has been entered into the central database, its corresponding sales details are available to be seen via the web-based application. Hence, in some examples, the customer may access the sales details of an order before it is shipped to verify that the order is correct.

It will be recognized that the web page configuration shown in FIG. 10 is merely illustrative of the many different web page configurations that may be used to show the sales details for a particular order. The sales details may include additional or alternative information as best serves a particular customer or type of produce.

Returning to FIG. 8, the customer may alternatively desire to view the shipping details of a particular order (e.g., file number 62247). To do so, the customer may select the "View" link under the "Ship Detail" heading corresponding to the file number 62247. Upon selecting the "View" link, the shipping details of the selected order appear on the screen.

FIG. 11 is a screen shot of a web page showing an exemplary number of shipping details of a particular order. As shown in FIG. 11, the shipping details web page may show a digital picture of one or more samples of each brand of produce within the selected order, a tracking number (e.g., the USDA PLI number) for each of the brands within the order, and quantity information for each of the brands within the order.

For example, as shown in FIG. 11, the customer may see that the brand labeled as JY1GNP50 has a USDA PLI number of 49401 and was grown at Deseret Farms. Likewise, the brand labeled as JY1NONB50 has a USDA PLI number of 49102 and was grown by Ken Nelson.

It will be recognized that the shipping details web page configuration shown in FIG. 11 is merely illustrative of the many different web page configurations that may be used to show the shipping details of a particular order. The web page may include additional or alternative information as best serves a particular customer or type of produce. For example, the shipping details web page may include link to a digital video of the produce being processed and/or inspected within the packing facility.

The shipping details web page of FIG. 11 may additionally or alternatively include a link to another web page that shows additional tracing information corresponding to each of the brands of produce within the order. To view this tracing information, the customer may select the "View" link under the "Trace Write-up" heading. Upon selecting the "View" link, a detailed description of the field, grower, and/or packing facility may be shown.

Figure 12:
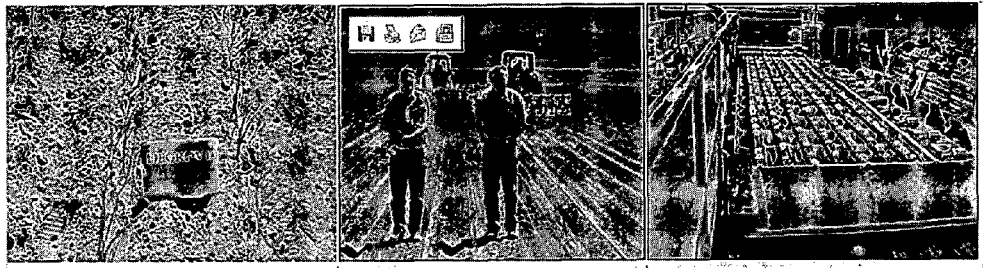
FIG. 12 is a screen shot of a web page showing exemplary tracing information corresponding to a particular order of produce according to principles described herein.

FIG. 12 is a screen shot of a web page showing exemplary tracing information corresponding to a particular order of produce. As shown in FIG. 12, the tracing information may include a picture and/or description of the field in which the produce within the order was grown. The description of the field may include the GPS coordinates of the field and/or a link to an online mapping service showing the field (e.g., Google Earth™). The description of the field may additionally or alternatively include a description of the particular produce grown in the field, the lot ID of the produce grown in the field, and details regarding the planting and harvesting of the produce.

As shown in FIG. 12, the tracing information web page may additionally or alternatively include a picture and/or description of the grower of the produce. The tracing information web page may additionally or alternatively include a picture and/or description of the packing facility where the selected order of produce was processed.

It will be recognized that the tracing information web page configuration shown in FIG. 12 is merely illustrative of the many different web page configurations that may be configured to show tracing information such as descriptions of the field, grower, and packing facility corresponding to the produce in a particular order. The summary may include additional or alternative information as best serves a particular customer or type of produce such as, but not limited to, Lot IDs and seed variety information.

In some examples, some or all of the information shown in any of the web pages of FIGS. 8-12 may be customized, reformatted, and/or omitted for a particular customer. For example, a broker may desire to restrict access to pricing information regarding a particular order for end customers (e.g., retailers). In this example, the sales details web page shown in FIG. 10 may be configured to hide pricing information and only show quantity information for each brand of produce within an order when accessed by an end customer.

Hence, the web-based application described in connection with FIGS. 8-12 may be used to quickly access information at any point along the supply chain corresponding to all of the produce that is processed in one or more packing facilities. The information may be sorted and viewed by packing facility, lot ID, tracking ID, USDA PLI number, customer, drop location, broker, field, grower, inspector, inspection results, harvest date, processing date, packing date, shipping date, shipping company, price, quantity, brand, type of produce, or by any other category as desired.

Moreover, the web-based application described in connection with FIGS. 8-12 may be used to standardize the various tracing methods used by different packing facilities. In other words, all the information is input into the central database in the same manner in each packing facility. In this manner, every entity throughout the supply chain may be able to access the same information regarding specific orders of produce, specific packing facilities, specific growing fields, etc.

In some examples, the web-based application described herein may also be used by a government inspector to ensure that proper procedures are followed by on-site inspectors. The government inspector may be a state or federal inspector. The government inspector may access and sort inspection summaries by packing facility, customer, order number, onsite inspector name, product, brand, date, etc. The web-based application saves the government inspector considerable time and resources by allowing him or her to access the information via the Internet.

For example, a government inspector may desire to access information regarding inspections of specific samples of produce within a lot of produce that is processed at a particular packing facility. If all the packing facilities use the present systems and methods to input processing and inspection information into the central database, the government inspector may use the web-based application to quickly access the desired inspection information, regardless of the packing facility where the produce was processed.

The web-based application described herein may also be used by a government agent to trace a product back to its corresponding packing facility and/or field where it was grown. For example, if a certain product in a particular grocery store is found to be contaminated, a government agent or onsite inspector may quickly determine where the product was grown and where it was processed prior to shipping by using the tracking number (e.g., the USDA PLI number) to query the web-based application to display tracing information corresponding to the product. If it is determined that the contamination occurred at the packing facility, for example, the government agent may then use the web-based application to quickly determine the location of all other produce processed at that packing facility so that the produce may also be tested, quarantined, or otherwise dealt with. In this manner, acts of bioterrorism, contamination, or any other problem associated with produce may be quickly remedied.

According to one exemplary embodiment described herein, the present exemplary system and method may be used to allow a customer to enter a trace code on a website and pull up all information regarding the grower, field, and packer of the product. Additionally, as will be described in further detail with reference to FIGS. 13A through 15, the present system will allow for assigning a sample picture for each trace code lot and to link all the trace codes associated with a single lot so that every order associated with a single lot may be identified if desired. Further details are provided below.

Figure 13A:
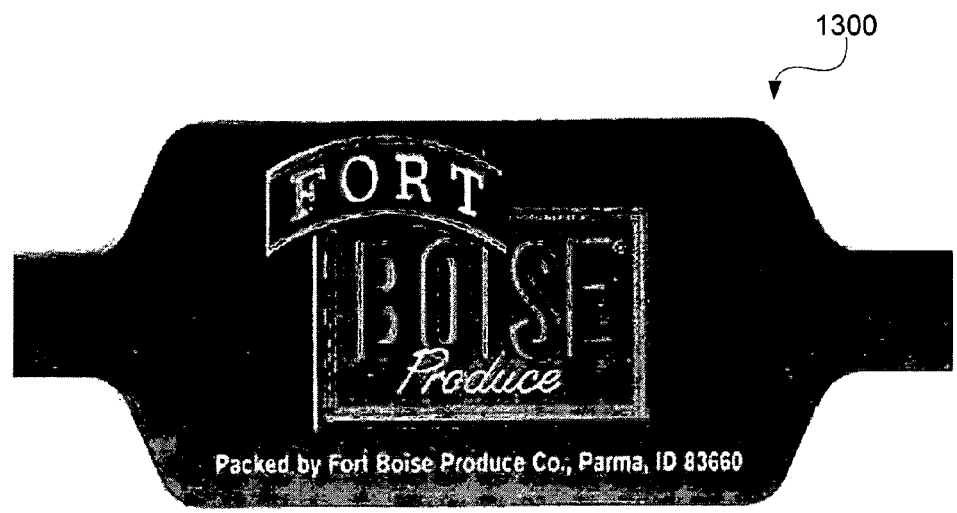
FIGS. 13A and 13B illustrate both sides of an exemplary packing label including a lot ID, according to one exemplary embodiment.
Figure 13B:

As mentioned previously, according to one exemplary embodiment, the marking information including a lot identification number may be affixed to each piece of produce within an order. Alternatively, each bag or other container of the produce may include a sticker or a tag including the lot identification number. FIGS. 13A and 13B illustrate a front and a back, respectively, of an exemplary tag (1300), according to one exemplary embodiment. As shown in FIG. 13A, the front of the tag (1300) may include source indicating information including, but in no way limited to information related to the packing facility or broker sourcing the product.

As shown in FIG. 13B, the back side of the exemplary tag (1300) may include further product identifying information including, but in no way limited to, product type, weight, and a system barcode. Additionally, as illustrated, the exemplary tag (1300) may include a lot identification component (1310). Moreover, as shown in FIG. 13B, an HTML address or other identifier indicating where the customer portal configured to receive the lot identification component can be found may bed disposed on the exemplary tag (1300). While the exemplary tag (1300) illustrated in FIGS. 13A and 13B illustrates the lot identification component on the back side of the tag, the exemplary lot identification component may be on any surface.

Figure 14:
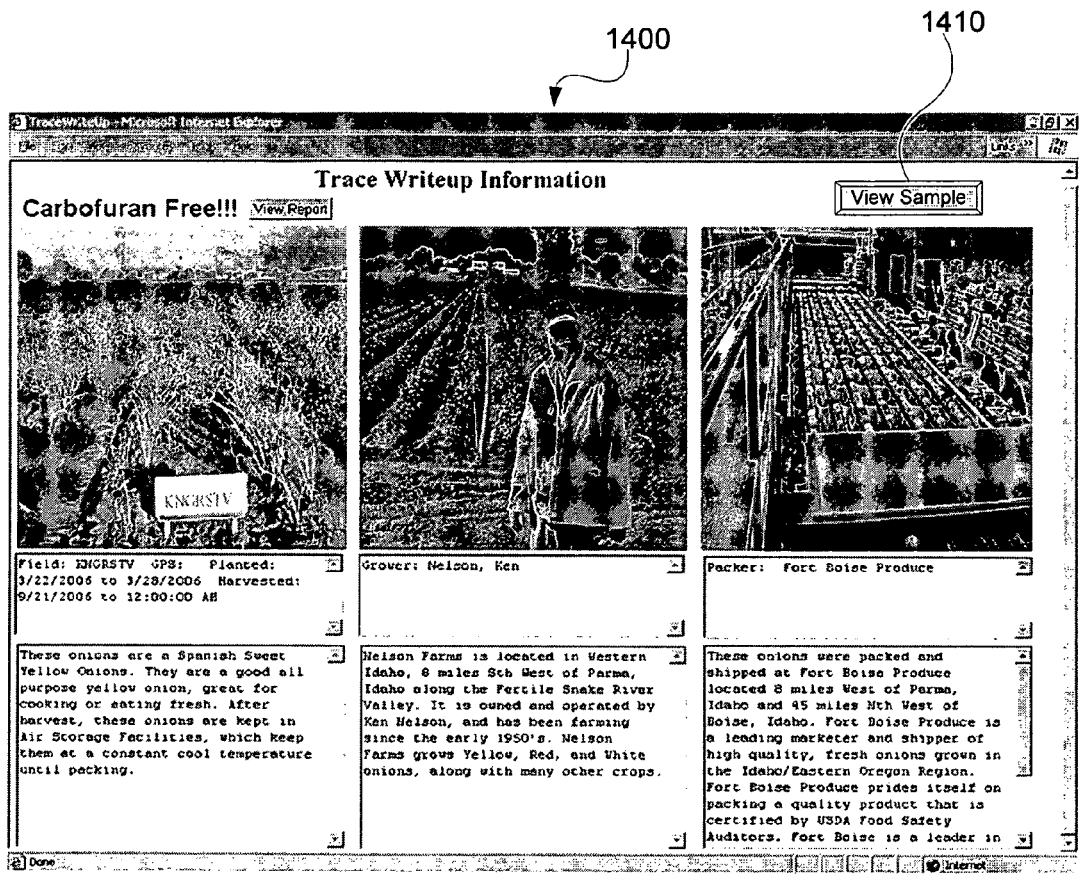
FIG. 14 is a screen shot of a web page showing an exemplary trace information page in response to entering a lot ID, according to one exemplary embodiment.

According to one exemplary embodiment, when the lot identification component (1310) is entered into a customer portal, information related to the products assigned the lot identification component is displayed. As illustrated in FIG. 14, after the lot trace code or other lot identification component is entered into a customer portal (not shown), a trace write up (1400) or other desired information may be displayed to the customer. As illustrate in FIG. 14, according to one exemplary embodiment, the trace write-up information displayed after entering the lot identification component (1310) may include, but is in no way limited to, detailed information about the source field of the produce, the source grower of the associated produce, and the packing facility of the associated produce.

Additionally, as illustrated in FIG. 14, a button may be present on the interface that allows a customer to view a sample of the produce associated with the lot identification component (1310; FIG. 13B). Specifically, as mentioned previously, the photographs associated with the inspection programs can be assigned to the lot identification component (1310) such that when the view sample button (1410) is selected, the photograph from the inspection programs associated with the lot is displayed.

In some examples, the produce is additionally or alternatively inspected at a receiving point (e.g., at the broker's place of business or at the retailer's place of business). For example, the federal government has recently established the Fresh Electronic Inspection Reporting/Resource System (FEIRS), which includes an electronic means of recording the inspection summaries prepared by the receiving point inspectors. In some examples, the results of these receiving point inspections are linked to the tracking ID of the produce. In this manner, the receiving point inspection results may also be accessed by customers.

Figure 15:
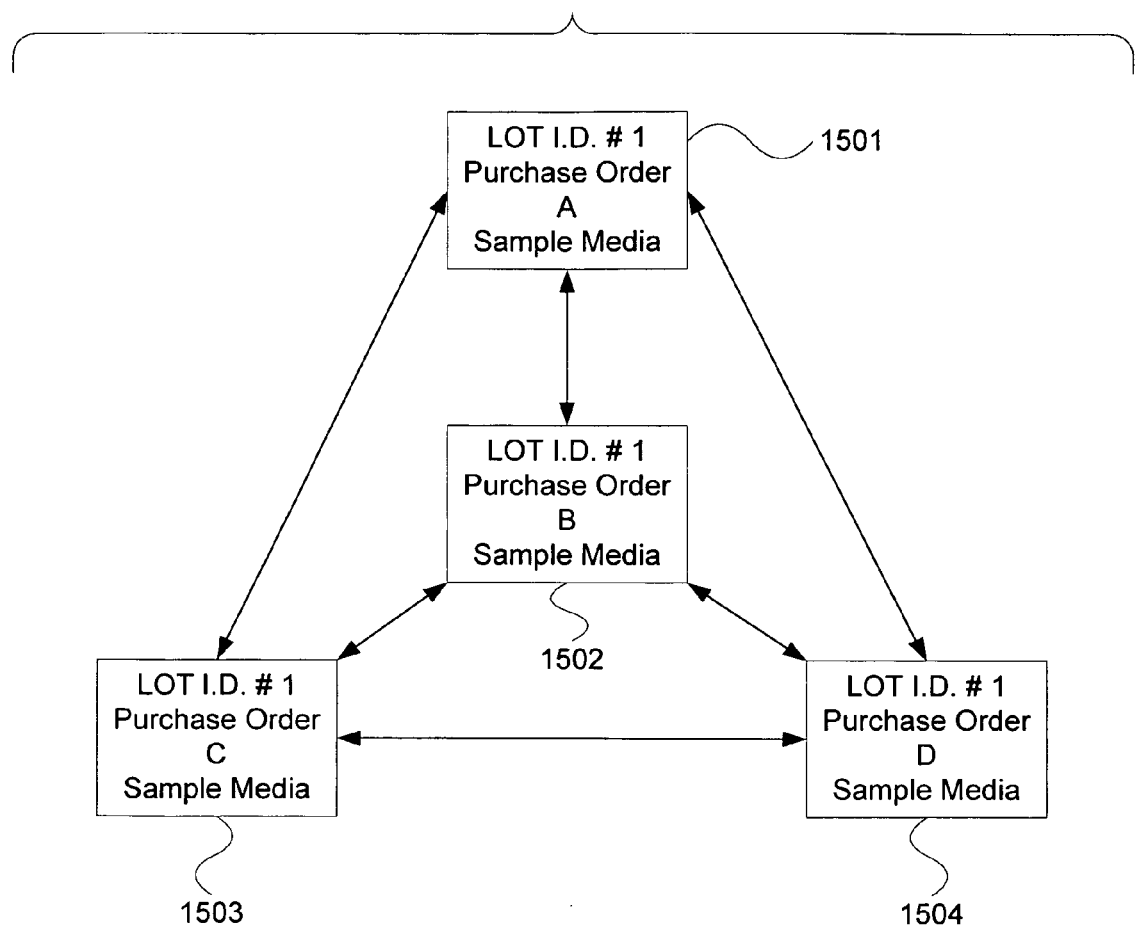
FIG. 15 is a block diagram illustrating a relationship allocation of a lot of produce corresponding to a single lot ID within a server, according to one exemplary embodiment.

Additionally, according to one exemplary embodiment, all of the purchase orders associated with a lot identification component (1310; FIG. 13B) may be linked within the server (51). FIG. 15 illustrates the data structure of the server (15) memory modules, according to one exemplary embodiment. As illustrated, multiple purchase orders (1501, 1502, 1503, and 1504) may originate from a single lot, and consequently have the same lot identification component. However, the various purchase orders may be shipped to different locations such as food service locations (15; FIG. 1), retailers (14; FIG. 1), and/or consumers (13; FIG. 1). According to the present exemplary system and method, the various purchase orders stemming from a single lot are linked together within the server (15).

According to the present exemplary embodiment, linking the associated purchase orders stemming from a single lot allows for the rapid identification of all of the orders that are transported from a single lot. For example, if a problem is identified from a single purchase order, such as reports of botulism, e-coli, rot, or other difficulties, the purchase orders associated with the entire lot may then be identified and inspected or re-called as the situation merits. For example, according to one exemplary embodiment, a user may enter the USGA code to identify a single order. Once entered, all of the orders related to the entered USGA code will be identified. As illustrated in FIG. 15, each data module representing the individual orders will, according to one exemplary embodiment, include a lot identification component, a purchase order identifier, and a sample media link. According to one exemplary embodiment, the sample media link may include a photograph, audio recording, video presentation, or other multimedia presentation of the grower, facility, and/or inspection. For example, according to one exemplary embodiment, the multimedia presentation may include a video of the grower discussing how a field was planted or cared for, the history of the farm, and/or a discussion of the inspection process and results.

Additionally, according to one exemplary alternative embodiment, the act of entering the HTML address or other identifier found on the exemplary tag (1300) illustrated in FIG. 13B initiates a directed marketing campaign related to the associated produce. According to one exemplary embodiment, the server (51; FIG. 7) identifies the general geographic location of the end customer (18; FIG. 7) via any number of information gathering techniques including, but in no way limited to, requesting general geographical information via a survey or by using the end customer's IP address and the Internet Service Provider information associated with the remote terminal (52-4). According to this exemplary embodiment, once the server (51; FIG. 7) or other remote computing device receives and general geographic location of the end customer (18; FIG. 7), a geographically based targeted advertisement campaign, related to the tracked produce may be launched. According to one exemplary embodiment, the server (51; FIG. 7) identifies the geographic location of the end customer (18; FIG. 7) and identifies what produce is associated with the tracking ID entered. Once the geographic location and the produce are identified, a targeted advertisement campaign can generate advertisements for restaurants in the general geographic area of the end customer (18; FIG. 7) that use the same produce. Alternatively, an advertisement may be presented to the end customer related to recipes for sale that may be made with the identified produce or related objects that the end customer (18; FIG. 7) may have particular interest in.

It will be recognized that the web-based application described herein may additionally or alternatively be used to access any other type of information corresponding to produce that is processed in one or more packing facilities. For example, a grower may use the web-based application to access packout and/or inventory information regarding produce that he or she grows or otherwise produces. Such packout and/or inventory information may include, but is not limited to, bin reports, packout reports, lot reports, and truck reports. These reports may allow the grower to view how his or her produce is being inspected, processed, and shipped. They may also allow the grower to calculate an expected return on investment due to the packing performance of his or her produce. Web pages may be designed that allow access to such information as best serves a particular application.

The preceding description has been presented only to illustrate and describe embodiments of the invention. It is not intended to be exhaustive or to limit the invention to any precise form disclosed. Many modifications and variations are possible in light of the above teaching.

What is claimed is:

1. A commodity inspection method, comprising:
   a single supplier gathering quality control inspection information from a commodity lot;
   said single supplier collecting grower, field, and packing information associated with said commodity lot;
   said single supplier assigning a trace code to each commodity of said commodity lot;
   said single supplier entering said inspection information, said grower, field, and packing information, and said trace codes into a central database;
   said single supplier updating a content of a web-based application with said inspection information, said grower, field, and packing information, and said trace codes within said central database; and
   displaying said inspection information, and said grower, field, and packing information, to a customer in response to said customer entering one of said trace codes into said web-based application;
   wherein each commodity of said commodity lot is a produce.

2. The commodity inspection method of claim 1, wherein said inspection information comprises a photograph of an inspected sample of said commodity lot.

3. The commodity inspection method of claim 1, wherein said grower, field, and packing information comprises a photograph of a source of said commodity, a photograph of a grower of said commodity, and a photograph of a packing facility where said commodity is processed.

4. The commodity inspection method of claim 3, wherein said grower, field, and packing information and said inspection information each comprise a multimedia presentation detailing information of said grower, field, and packing information and said inspection information.

5. The commodity inspection method of claim 1, wherein assigning a trace code to each commodity of said commodity lot comprises:
   assigning a single tracking identification (tracking ID) to said commodity lot;
   wherein entry of said tracking ID in said web-based application by said customer causes said web-based application to display said inspection information, and said grower, field, and packing information to said customer.

6. The commodity inspection method of claim 5, wherein said tracking ID comprises a United States Department of Agriculture positive lot identification number (USDA PLI number).

7. The commodity inspection method of claim 1, further comprising:
   recording purchase orders associated with said commodity lot; and
   allowing said customer to access each of said purchase orders associated with said commodity lot by entering one of said trace codes into said web-based application.

8. The method of claim 1, wherein said gathering inspection information from a commodity lot comprises:
   separating a representative sample from said commodity lot;
   recording observational information about said representative sample; and
   photographing or videotaping said representative sample.

9. The method of claim 1, further comprising labeling each individual commodity of said commodity lot with said trace code.

10. The method of claim 1, further comprising linking said purchase orders associated with said commodity to a third party geographic locator via said web based application;
   wherein said third party geographic locator is configured to illustrate to said customer where said commodity was grown.

11. The method of claim 1, further comprising:
   determining a general geographic location of said customer; and
   presenting a geographically specific directed marketing campaign to said customer via said web based application in response to an entry of one of said trace codes into said web based application;
   wherein said geographically specific directed marketing campaign is configured to present said customer with advertisements geographically related to said customer's general geographic location and related to said commodity.

12. A commodity inspection method, comprising:
a single supplier gathering inspection information in the form of a photograph of a portion of said commodity lot;
said single supplier collecting grower, field, and packing information associated with said commodity lot;
said single supplier recording purchase orders associated with said commodity lot;
said single supplier assigning a trace code to each of said purchase orders;
said single supplier marking each commodity of said commodity lot with said trace code;
said single supplier entering said inspection information, said grower, field, and packing information, said purchase orders, and said trace codes into a central database;
said single supplier updating a content of a web-based application with said inspection information, said grower, field, and packing information, said purchase orders, and said trace codes within said central database;
displaying said inspection information, and said grower, field, and packing information to a customer when said customer enters one of said trace codes into said web-based application, wherein each of said purchase orders associated with said commodity lot are linked within said web-based application;
determining a general geographic location of said customer; and
presenting a geographically specific directed marketing campaign to said customer in response to an entry of one of said trace codes into said web-based application;
wherein said geographically specific directed marketing campaign is configured to present said customer with multimedia advertisements geographically related to said customer's general geographic location and directly related to said commodity via said web-based application.

13. The commodity inspection method of claim 12, wherein said grower, field, and packing information presented to said customer via said web-based application comprises one of a photograph of a source of said commodity, a photograph of a grower of said commodity, and a photograph of a packing facility where said commodity is processed.

14. The commodity inspection method of claim 12, wherein said inspection information further comprises a video recording of said commodity lot being inspected.

\* \* \* \* \*